(12) United States Patent  (10) Patent No.: US 8,682,297 B2
Chevsky et al.  (45) Date of Patent: Mar. 25, 2014

(54) SEAMLESSLY AUTHENTICATING DEVICE USERS

(71) Applicant: TangoMe, Inc., Palo Alto, CA (US)

(72) Inventors: Gary Chevsky, Palo Alto, CA (US); Gregory Dorso, Palo Alto, CA (US); Ramiro Estrugo, Los Altos, CA (US); Nathan Ferris, San Francisco, CA (US); Xu Liu, San Jose, CA (US); Uri Raz, Palo Alto, CA (US); Eric Setton, Menlo Park, CA (US); Erik Worth, Milpitas, CA (US)

(73) Assignee: TangoMe, Inc., Mountain View, CA (US)

( * ) Notice: Subject to any disclaimer, the term of this patent is extended or adjusted under 35 U.S.C. 154(b) by 0 days.

(21) Appl. No.: 13/649,468

(22) Filed: Oct. 11, 2012

(65) Prior Publication Data

US 2013/0090088 A1 Apr. 11, 2013

Related U.S. Application Data

(60) Provisional application No. 61/546,007, filed on Oct. 11, 2011.

(51) Int. Cl.
H04M 1/66 (2006.01)
H04M 1/68 (2006.01)
H04M 3/16 (2006.01)

(52) U.S. Cl.
USPC ............... 455/411; 455/410; 726/4; 726/5

(58) Field of Classification Search
USPC .................. 455/410, 411; 726/4, 5
See application file for complete search history.

(56) References Cited

U.S. PATENT DOCUMENTS

| 7,224,786 | B2 | 5/2007 | Daugherty et al. |
| 7,983,455 | B2 | 7/2011 | Moise et al. |
| 8,037,515 | B2 | 10/2011 | Lundblade |
| 8,316,421 | B2* | 11/2012 | Etchegoyen ............... 726/4 |
| 2005/0060157 | A1* | 3/2005 | Daugherty et al. ......... 704/273 |
| 2005/0097330 | A1* | 5/2005 | Lundblade ............... 713/176 |
| 2006/0104224 | A1* | 5/2006 | Singh et al. .............. 370/310 |
| 2007/0198453 | A1 | 8/2007 | Lam et al. |
| 2008/0152202 | A1* | 6/2008 | Moise et al. ............. 382/120 |
| 2009/0064296 | A1* | 3/2009 | Aikawa et al. ............. 726/6 |
| 2009/0089869 | A1* | 4/2009 | Varghese ................ 726/7 |
| 2010/0257600 | A1* | 10/2010 | Neil et al. ............. 726/15 |
| 2010/0269156 | A1* | 10/2010 | Hohlfeld et al. .......... 726/4 |

FOREIGN PATENT DOCUMENTS

| KR | 20060013333 | 2/2006 |
| WO | 02/05078 | 1/2002 |

OTHER PUBLICATIONS

"International Search Report PCT/2012/059827", 8 pages.

* cited by examiner

Primary Examiner — Liton Miah

(57) ABSTRACT

A method for seamlessly authenticating users of a first and second device is described. The method includes: determining a set of first signatures for a first device; generating a set of second signatures for a second device; comparing the set of first signatures with the set of second signatures; and based on the comparing, granting a user authentication status if a difference between the set of first signatures and the set of second signatures is less than a predetermined tolerance threshold, and rejecting the user authentication status if a difference between the set of first signatures and the set of second signatures is more than the predetermined tolerance threshold.

18 Claims, 2 Drawing Sheets

SEAMLESSLY AUTHENTICATING DEVICE USERS

CROSS REFERENCE TO RELATED APPLICATIONS

This application claims priority to and benefit of U.S. provisional patent application Ser. No. 61/546,007, entitled "AUTHENTICATING USERS SEAMLESSLY," Chevsky et al., filed Oct. 11, 2011, which is herein incorporated by reference in its entirety.

BACKGROUND

With the rapid growth of technology, people are frequently updating and upgrading their various devices. Typically, when a user switches to a new device through an upgrade, such as a new mobile phone, he/she registers the new phone with the phone number of the old phone. There are many limitations associated with authenticating a user of a new phone as being authorized to access the account associated with an old phone.

DESCRIPTION OF EMBODIMENTS

Figure 1:
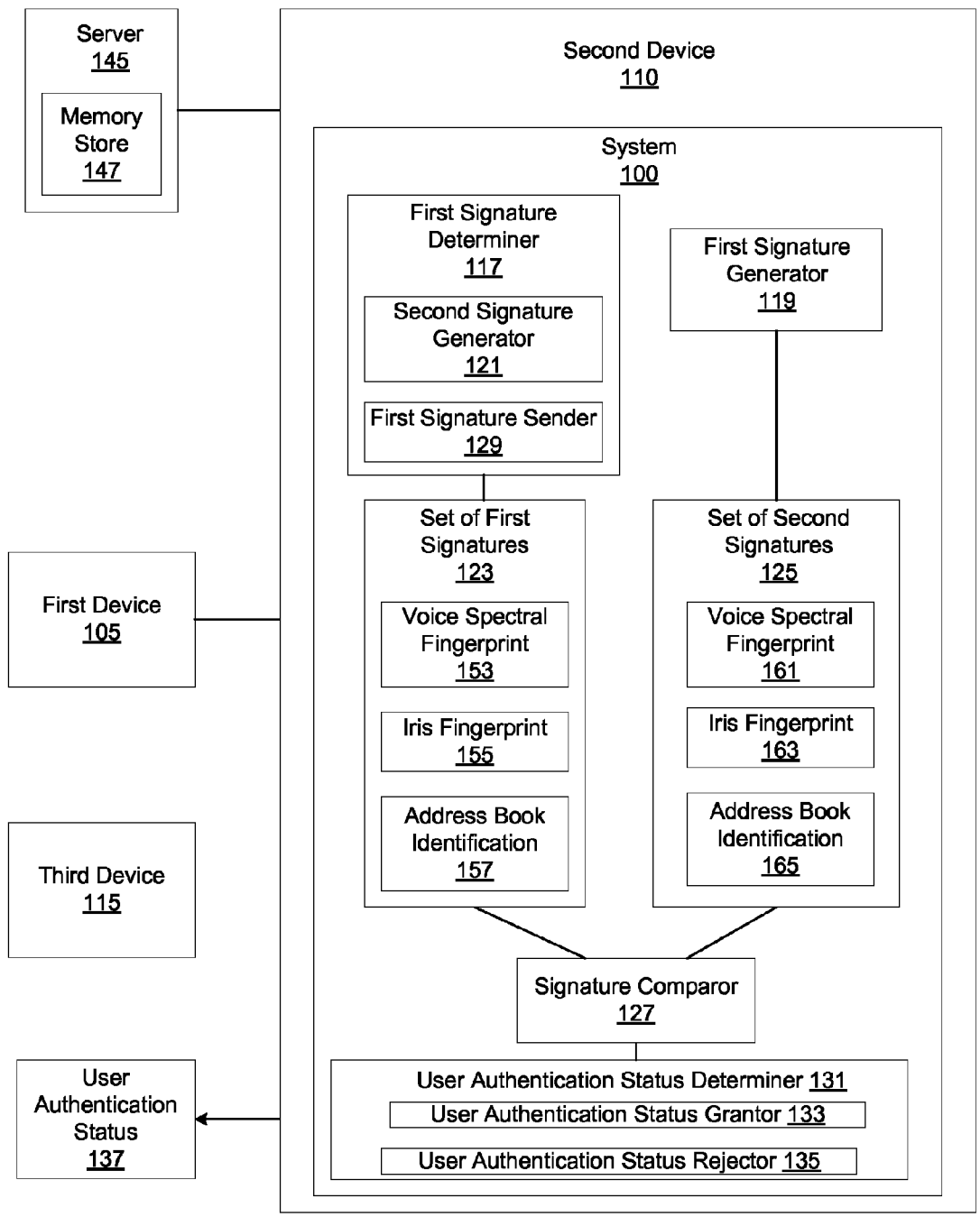
FIG. 1 is an example of a system for seamlessly authenticating users of a first device and a second device, in accordance with embodiments.

The drawings referred to in this description should be understood as not being drawn to scale except if specifically noted.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope. Furthermore, in the following description, numerous specific details are set forth in order to provide a thorough understanding of the subject matter. However, some embodiments may be practiced without these specific details. In other instances, well-known structures and components have not been described in detail as not to unnecessarily obscure aspects of the subject matter.

Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of an electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "determining", "generating", "comparing", "granting", "accessing", "sending", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As will be described below, embodiments enable the seamless authentication of users of a first device and a second device (e.g., mobile devices). Via embodiments and subsequent to a device upgrade, the user of a first device is able to access his/her user account for the first device, through the second device, after a user authentication status is granted. The granted user authentication status indicates the second device user account is the same user account as the first device user account, thereby allowing access to the user of the second device.

Generally, when a user switches to a new phone (such as, but not limited to, through an upgrade), he registers again with his old phone number. In some approaches to the method of authenticating a user of a new phone as being authorized to access the account associated with an old phone, users authenticate to services by creating pairs (e.g. username, password) and using these credentials to "login". This requires the user to generate and remember his credentials. In another situation, the user may want to authenticate while the service is on another device. A typical use case for this is when the user upgrades her mobile device, yet wants to get back into her account.

In order to reduce friction with the user, some systems hide the credential provisioning process from the user completely and use local storage to store the auto-created credentials unbeknown to the user. This can be used in mobile device applications such that the user can just launch the application and not provide any credentials. However, the application will authenticate with the service correctly. In this situation, the user did not create any credentials. The credentials are stored in the mobile device's local storage.

Even though there is no log in and password, one approach to determining that the user registering the new phone under the old phone number is in fact authorized to access the account associated with the old phone number involves sending an SMS to the new phone (to guarantee that the user of the phone is who he claims to be). By virtue of receiving the SMS, the user has been authenticated. For example, when an application is reinstalled or a phone is changed (e.g. upgrading), and assuming that the phone number is the same, when an application is registered again, the new device does not have the user's credentials. In one approach, the backend of the application will detect that the phone number is already in use (the user's pre-existing account). The application will detect this conflict and attempt to make sure the user is who the user claims to be and not an imposter trying to access the account. In order to validate the user, an SMS is sent to the supposed user. The SMS will contain a code. By "clicking" on the SMS, the application with that code is launched. The code is presented at the backend, and the backend determines that the "user" was able to find the code and the user is who he claims to be.

Embodiments enable the determination of a user's information that serves as a kind of "fingerprint" or "user signature" that reconciles the user and the account. The user signature is used as a second factor of authentication. The requirement is for this signature to be reproducible in such a way that the same user will generate identical or very close signatures (sometimes, items on the new phone change [e.g. items within the contact information], which affects the credentials) irrespective of the device they are using.

Types of signatures may be, but are not limited to being, the following: a voice spectral fingerprint; an iris fingerprint; and an address book signature (described below) (on mobile phones, the user usually transfers her address book from her old device to the new device). By providing this signature to the service, the user is requesting authentication on the basis that only he can provide such a signature.

Following is a description of using an address book as a signature, in accordance with embodiments.

In mobile devices, especially mobile phones, the user typically has an address book (contact list) populated with personal information. This is generally transferred over when the user upgrades his phone. An embodiment uses the user's address book to compute a signature as follows.

(1) An array of 64 integers (32 bit values) is initialized to 0. These are "bins".
(2) For each contact in the address book:
   a. A CRC32 hash value is computed based on the content of the contact (first name, last name, phone numbers, email addresses, etc);
   b. The first 6 bits of the CRC32 computed in "a" above is used to determine a bin number (from 0 to 63) out of 64 bins; and
   c. An XOR function is performed, using the integer that is currently in the bin and the CRC32 computed in "a" above.
(3) The 64 integers are concatenated together to form the signature. Optionally, the signature size is reduced by getting rid of the first few order bits in the resulting CRC32 values for each bin. This is because, by definition, all CRC 32 values ending up in a given bin share the same first 6 bits, so XOR'ing these values will make the first 6 bits change from the bin number to 0 and back and forth.

The client(s) reports this signature when they authenticate with the server so that the server can keep its copy of the signature up to date. If a user does not have her credentials in local storage anymore (such as in an application reinstall or a phone upgrade), the newly installed application will attempt to compute the signature again (following the process described above) and send it to the server.

The server will compare the stored signature with the new signature by comparing each bin. For example, let N be the number of bins that differ. If N is bigger than a predetermined tolerance threshold, it is then determined that this signature does not match the signature of the user as the server knows it, and the authentication is rejected. Otherwise, the authentication is granted. While this example was described in terms of an address book, the methods herein may be applied to other use information in a device.

An embodiment provides for detecting if there is a conflict between the signatures of the old phone and the new phone. Instead of triggering the SMS process, an embodiment tries to figure out if there is something that a new application installed, for example, would know about the user who is claiming owns the phone number, and then some calculations are done on the back end. Essentially, an embodiment is trying to figure out if there is anything that is already known about the new phone that matches closely enough to the old phone. Thus, a user signature is used as a second factor of authentication.

For example, the address book signature is basically trying to figure out what the user's address book contains and trying to build a signature out of it. The reason for this is if a user switches to a new phone, there's a good chance that the first thing that a user needs to have on his new phone is his contacts.

So, contacts are retrieved and applications are downloaded. Thus, a premise exists when switching phones that there is a lot of information that is carried over (e.g. contact information). So, an embodiment generates a signature for this contact information in such a way that the signature associated with the user's new phone is able to be compared with the signature associated with the user's old phone. If those signatures are close enough, if the contact information is about the same, it probably means that the user is who he claims to be, by virtue of having the same contact information, or close to the same contact information.

When generating the signature or fingerprint of an address book, a distance is applied, a mathematical distance between two address books. An embodiment compares the two address books to figure out if they are close enough. The reason why this is done is that it would be very rare for two address books to be exactly the same from one phone to another. The reason is that when you install a new phone, the pre-existing entries in the address book, for example, 411, or if you just switch to a long distance carrier, there will be a long distance carrier customer support entry in the address book that was placed in the address book (and wasn't there before). So, there is a chance that the two address books are going to differ by at least a small amount.

An embodiment of the present technology determines the distance between the two address books so that it can be determined if the two address books match closely enough to authenticate the user.

CRC matching enables a distance to be built between two address books. Buckets are created, for example, 64 buckets. These buckets are going to contain fingerprints of a subset of the address book. The address book may have 5000 entries. In one example, each of these entries is going to have the first name, last name, a phone number, and email addresses. From this information, buckets are determined. For each contact, the contact information is going to go into a bucket. Another contact and the contact information are going to go into another bucket. The reason that a hash function is used to determine a bucket is so that a given contact is always in the same bucket (first name, last name, phone number, email addresses). The reason the hash of the existing data is used is so if we use any of the existing information, such as what is being indexed in the address book, a removal of one or two contacts or a new provider inserted a new contact, may cause some discrepancies. So the position of this entry in the new address book, using the index method, is not sufficient to map to a specific bucket.

A given contact, with the first name, last name, given phone number, email, etc. has to be in the exact same bucket on the new phone as of the old phone. So, only information that is very specific to that contact is used, whereas the index in the address book is not specific to the contact, because that index depends on the phone. So, when computing the contact information on the old phone and on the new phone, the contact information is going to end up in the same bucket. For example, let's say, here we have bucket number 3, so then we're going to have a bunch of contacts that are going to map to the same bucket number 3. So, once all the mapped contacts are computed, in a bucket, a master hash is created—a hash of all the contacts that slip into a bucket. So, in the example given here, three entries match to this bucket.

These three contacts are hashed to generate hash number three. This is done for the whole address book, which means that there will be 64 hashes in all. These 64 hashes become the signature or fingerprint, which is then reported to a server. The server stores the signature. The hashing and fingerprinting is taking place on the client (e.g. the phone).

The application is then going to be doing the same computing of a signature on the new phone. The new phone sends the new signature to the server. Now, there are 64 buckets on two sides (the old one and the new one). The buckets are going to be compared, one with the other, and the distance between the old address book and the new address book is equal to the number of buckets that are different. The threshold is predetermined.

For example, assume that a user of a new phone does not have the exact same address book as the old phone (e.g. one or two items that are removed or an entry of customer service support was provided). When having an extra entry on the new phone, one of the buckets with this new entry (that you didn't have before) matches with hash number 3. Now, the hash number 3 of the new phone is different from that hash number 3 of the old phone. There is some value V1 and value V2 here, by virtue of having this new contact. Now, there is one bucket that differs. Maybe it is determined that it is okay, that the threshold allows for three buckets being different. Thus, with a difference of one, it is determined that the user is in fact who he says he is. The threshold may be varied. It can be applied at different intervals and with a different periodicity.

FIG. 1 depicts a system 100 in its functional environment, in accordance with embodiments.

The discussion below will first describe the components of system 100. The discussion will then describe the functionality of the components of system 100 while seamlessly authenticating users. First device 105 and second device 110 are any communication devices (e.g., laptop, desktop, smartphones, tablets, TV, etc.) capable of communication with another communication device. In various embodiments, first and second devices, 105 and/or 110, respectively, are a handheld mobile device, such as smart phone, personal digital assistant (PDA), and the like. Moreover, in one embodiment, the first device 105 and the second device 110 are the same device, as will be discussed below.

Moreover, for clarity and brevity, the discussion will focus on the components and functionality of the second device 110, including the system 100. However, it should be appreciated that the first device 105 operates in a similar fashion as the second device 110. In one embodiment, the second device 110 is an upgrade (a newer, more advanced, better, etc. version of the first device 105) of the first device 105; the second device 110 includes similar components to that of the first device 105. It should be appreciated that a system 100 may be installed on any number of devices, including the first device 105, the second device 110, and third device 115. It should further be appreciated that should an upgrade (obtaining a new device that is more advanced, better, etc.) of the second device 110 occur, then for purposes of the discussion of the functionality of the system 100 operating on the third device 115, in effect, the functions attributed to the second device 110 will be applied to the third device 115, and the functions attributed to the first device 105 will be applied to the second device 110.

In one embodiment, the device 110 includes the system 100. The system 100 includes, according to embodiments, the following: a first signature determiner 117; a first signature generator 119 coupled with the first signature determiner 117; a signature comparor 127 coupled with both the first signature determiner 117 and the first signature generator 119; and a user authentication status determiner 131.

The first signature determiner 117 determines a set of first signatures 123 for the first device 105. In one embodiment, this determination occurs through accessing a server 145 upon which the first signature 123 is stored in a memory store 147. (The server 145 is separate from the first device 105 and the second device 110.) For example, the memory store 147 stores device signatures, of which the set of first signatures 123 is one. The first signature determiner 117 retrieves, through accessing, the set of first signature 123. In another embodiment, the first signature determiner 117 includes the second signature generator 121. The second signature generator 121 generates the set of first signature 123. The second signature generator 121 accesses the first device 105 and generates a set of digital data representing a portion thereof. Of note, the generation of this digital data occurs such that the generated set of digital data is intended to be enabled for comparison with another set of digital data from the second device 110, as will be described below with respect to the generation of the set of second signatures 125 by the first signature generator 119. In one embodiment, a first signature sender 129 is coupled to the second signature generator 121. The first signature sender 129 sends the set of first signatures 123 to the memory store 147 on the server 145. It should be appreciated that the set of first signatures 123 and the set of second signatures 125 each may be one or more signatures.

Moreover, in one embodiment and as was introduced above, the first device 105 and the second device 110 are the same device. For example, the first device 105 contains an application "A", while the second device 110 contains an upgraded application "A", which for purposes of this discussion, will be referred to as application "B". Application "A" is associated with user "X" through the user "X" account. However, in order to determine if the user account of the newly installed application "B" may also be accessed by user "X" (while the application "A" is removed), the system 100 determines if the address book of the device 105 (with which the application "A" is linked) is the same or nearly the same as the address book of the device on which the application "B" is installed. If the address books are the same or nearly the same, then it may be determined that the user who is authorized to access the user account for the application "A" is also the user who is authorized to access the user account for the application "B" which is installed on the same device on which application "A" was installed. Thus, in this embodiment, the first device 105 is the same as the second device 110, having the system 100 installed thereon. In other words, when an upgrade of an application is installed on a phone, the set of first signatures 123 that existed for the phone right before the upgrade was installed is determined. Once the upgrade is installed, the set of second signatures 125 for the phone is determined. If the set of first signatures 123 and the set of second signatures 125 match according to a predetermined formula (tolerance threshold, as is discussed herein), then it is determined that the address books of the phone having the old application on it and the phone having the upgraded application on it are the same, and thus the user should be granted access to the user account of both the old and the upgraded application.

As noted herein, the set of first signatures 123, in various embodiments, may optionally be the following: a voice spectral finger print 153; an iris fingerprint 155; and an address book identification 157. Likewise, the set of second signatures 125, in various embodiments, may optionally be the following: a voice spectral finger print 161; an iris fingerprint 163; and an address book identification 165.

The first signature generator 119 generates the set of second signatures 125 for the second device 110. The set of second signatures 125 is a digital description of a portion of the second device 110 (e.g., address book, voice spectral fingerprint, iris fingerprint) that may be compared to a similar component of the first device 105. As the first device 105 and the second device 110 both have embodiments thereon, the system 100 of the second device 110 is enabled to digitally generate a set of data (e.g. an address book) that matches a similar set of data on the first device 105 such that the two sets of data may reasonably be compared and a meaningful output may result.

The signature comparor 127 compares the set of first signatures 123 with the set of second signatures 125. This comparison outlines the similarities and/or differences between the set of first signatures 123 and the set of second signatures 125. The comparison is accomplished using the method that was described above and herein with regard to the address book. For example, when generating the comparing the set of second signatures 125 of the address book on the second device 110 to the set of first signatures 123 of the address book on the first device 105, a mathematical distance is applied between the two address books. The distance value associated with the applied mathematical distance is compared to a predetermined tolerance threshold. If the distance value is greater than the predetermined tolerance threshold, then it is determined that the set of second signatures 125 does not match the set of first signatures 123, and therefore the user account of the second device 110 and the first device 105, upon which the two address books are located, is not the same.

The user authentication status determiner 131 determines the user authentication status 137 based on the comparing performed by the signature comparor 127. In embodiments, the user authentication status determiner 131 optionally includes the following: the user authentication status grantor 133; and the user authentication status rejector 135. As described, in one embodiment, if the difference between the set of first signatures 123 and the set of second signatures 125 is less than the predetermined tolerance threshold, then the user authentication status grantor 133 indicates that a user account of the first device 105 and the second device 110 are the same. If the difference between the set of first signatures 123 and the set of second signatures 125 is more than the predetermined tolerance threshold, then the user authentication status rejector 135 indicates that a user account of the first device 105 and the second device 110 are different. Thus, in one embodiment, the user and owner of the second device 110 may not be user and owner of the first device 105, if the user account of the first device 105 and the second device 110 is found to be different.

Figure 2:
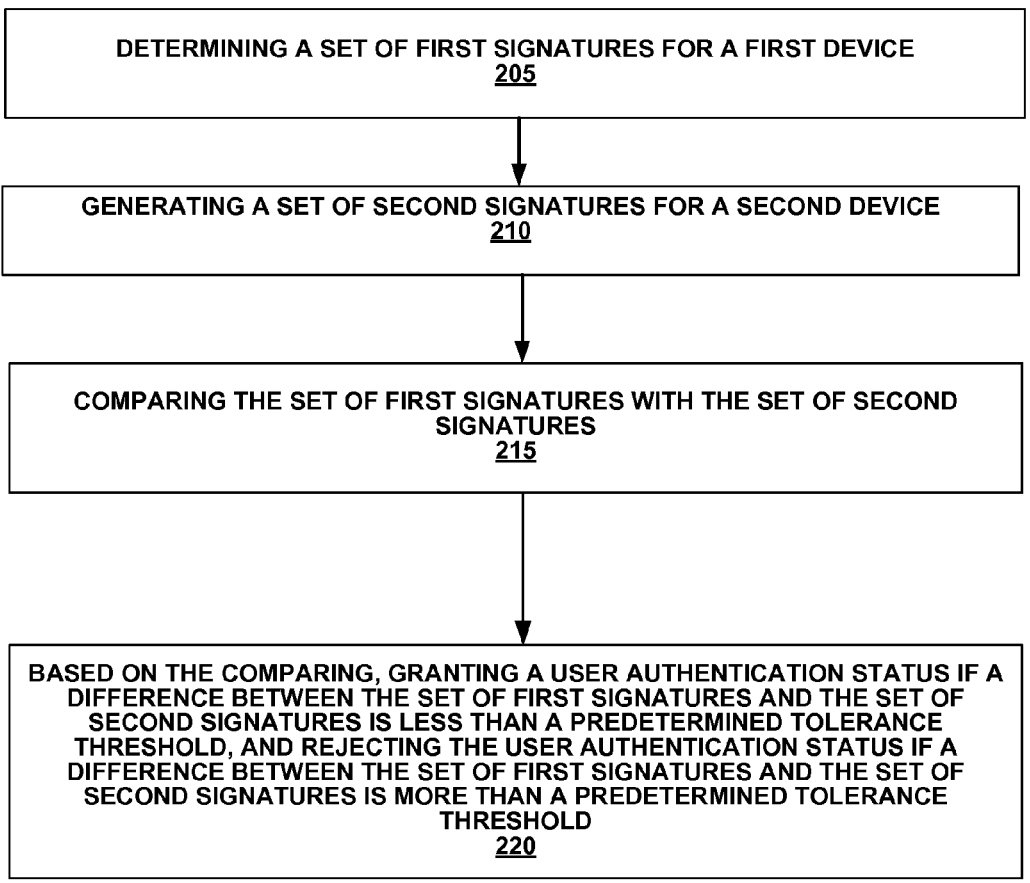
FIG. 2 is a flow diagram of a method for seamlessly authenticating users of a first device and a second device, in accordance with embodiments.

FIG. 2 is a flow diagram of a method 200 for seamlessly authenticating users of a first and a second device. In various embodiments, method 200 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 200 is performed at least by the system 100, as depicted in FIG. 2.

With reference now to FIGS. 1 and 2, at operation 205 of method 200, in one embodiment and as described herein, the set of first signatures 123 is determined for the first device 105. In one embodiment and as described herein, the determining at operation 205 includes accessing the set of first signatures 123 that is stored at the memory store 147 of the server 145. In another embodiment, and as described herein, the determining at operation 205 includes generating the set of first signatures 123. In another embodiment and as described herein, the generating of the set of first signatures 123 further includes sending the set of first signatures 123 to the memory store 147 of the server 145.

At operation 210, in one embodiment and as discussed herein, the set of second signatures 125 for the second device 110 is generated.

At operation 215, in one embodiment and as described herein, the set of first signatures 123 and the set of second signatures 125 are compared.

At operation 220, in one embodiment and as described herein, the user authentication status 137 is granted, if a difference between the set of first signatures 123 and the set of second signatures 125 is less than a predetermined tolerance threshold. If the difference between the set of first signatures 123 and the set of second signatures 125 is more than the predetermined tolerance threshold, then the user authentication status 137 is rejected. Once the user authentication status 137 is granted or rejected, the user is granted or denied, respectively, access to the user account, in one embodiment.

Thus, embodiments enable the seamless authentication of users of two devices. This authentication occurs automatically via the application (including embodiments described herein) installed on devices. Embodiments thus enable users/device owners to upgrade a device (e.g., mobile device) from a first device to a second device and still be able to automatically access the user account for both devices. Additionally, embodiments enable a user/device owner to upgrade applications on the device while being able to access the user account of both the old application and the upgraded application, once embodiments automatically review and determine a user authentication status.

All statements herein reciting principles, aspects, and embodiments of the technology as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present technology, therefore, is not intended to be limited to the embodiments shown and described herein. Rather, the scope and spirit of present technology is embodied by the appended claims.

What is claimed is:

1. A non-transitory computer readable storage medium having stored thereon, computer-executable instructions that, when executed by a computer, cause said computer to perform a method for seamlessly authenticating users of a first and second device, wherein said method comprises:
    determining a set of first signatures for a first device, wherein said set of first signatures is a digital description of a portion of said first device;
    generating a set of second signatures for a second device, wherein said set of second signatures is a digital description of a portion of said second device;
    comparing said set of first signatures with said set of second signatures, wherein said comparing said set of first signatures with said set of second signatures comprises:

applying a mathematical distance value between said set of first signatures and said set of second signatures; and comparing a distance value associated with said applied mathematical distance with a predetermined tolerance threshold; and granting a user authentication status if said distance value is less than a predetermined tolerance threshold, and rejecting said user authentication status if said distance value is more than said predetermined tolerance threshold.

2. The non-transitory computer readable storage medium of claim 1, wherein said determining a set of first signatures for a first device comprises:

when an upgrade of an application is installed on said first device, determining said set of first signatures that existed for said first device before said upgrade was installed.

3. The non-transitory computer readable storage medium of claim 2, wherein said generating a set of second signatures for a second device comprises:

generating a set of second signatures for a second device, wherein said first device and said second device are the same and wherein said second device is associated with said upgrade of said application that was installed.

4. The non-transitory computer readable storage medium of claim 1, wherein said determining said set of first signatures for said first device comprises:

accessing said set of first signatures that is stored at a memory store of a server.

5. The non-transitory computer readable storage medium of claim 1, wherein said determining said set of first signatures for said first device comprises:

generating said set of first signatures.

6. The non-transitory computer readable storage medium of claim 5, further comprising:

sending said set of first signatures that was generated to a memory store of a server.

7. A system for seamlessly authenticating users of a first and second device, wherein said system comprises:

a first signature determiner coupled with a computer, said first signature determiner configured for determining a set of first signatures for a first device, wherein said set of first signatures is a digital description of a portion of said first device;

a second signature generator coupled with said first signature determiner, said second signature generator configured for generating a set of second signatures for a second device, wherein said set of second signatures is a digital description of a portion of said second device;

a signature comparor coupled with said first signature determiner and said second signature generator, said signature comparor configured for comparing said set of first signatures with said set of second signatures, wherein said comparing said set of first signatures with said set of second signatures comprises:

applying a mathematical distance value between said set of first signatures and said set of second signatures; and comparing a distance value associated with said applied mathematical distance with a predetermined tolerance threshold; and a user authentication status determiner coupled with said signature comparor, said user authentication determiner configured for, based on a comparison of said distance value with said predetermined threshold, determining a user authentication status.

8. The system of claim 7, wherein said user authentication status determiner comprises:

a user authentication status grantor configured for indicating that a user account of said first device and second device are the same.

9. The system of claim 7, wherein said user authentication status determiner comprises:

a user authentication status rejector configured for indicating that a user account of said first and second device are different.

10. The system of claim 7, wherein said set of first signatures is stored at a store on a server.

11. The system of claim 7, wherein said first signature determiner comprises:

a first signature generator configured for generating said set of first signatures.

12. The system of 11, further comprising:

a first signature sender coupled with said first signature generator, said first signature sender configured for sending said set of first signatures to a memory store of a server.

13. The system of claim 7, wherein said set of first signatures comprises:

a voice spectral fingerprint.

14. The system of claim 7, wherein said set of first signatures comprises:

an iris fingerprint.

15. The system of claim 7, wherein said set of first signatures comprises:

an address book identification.

16. The system of claim 7, wherein said set of second signatures comprises:

a voice spectral fingerprint.

17. The system of claim 7, wherein said set of second signatures comprises:

an iris fingerprint.

18. The system of claim 7, wherein said set of second signatures comprises:

an address book identification.

* * * * *